Dec. 19, 1944. D. E. BENCH ET AL 2,365,329
DISPENSING PUMP COMPUTER
Filed May 16, 1940 3 Sheets-Sheet 2
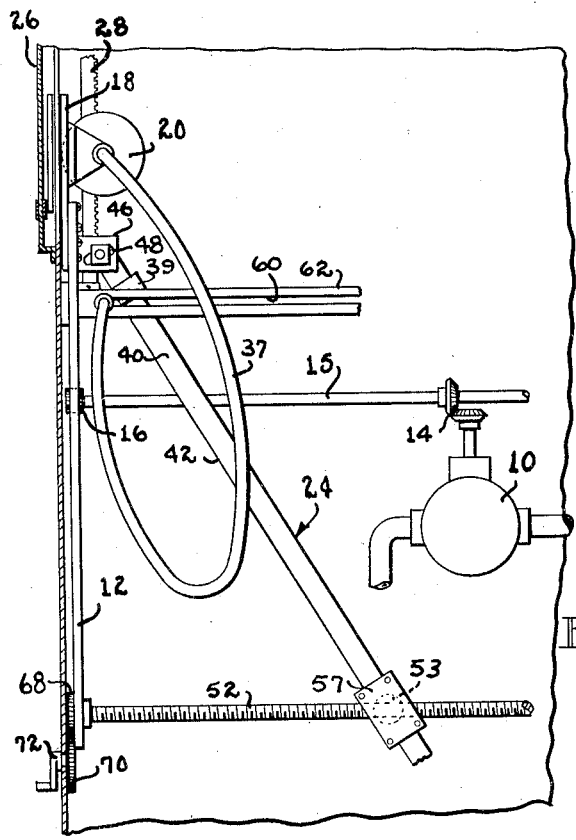
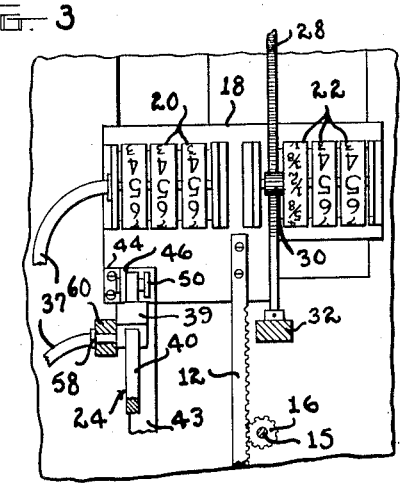
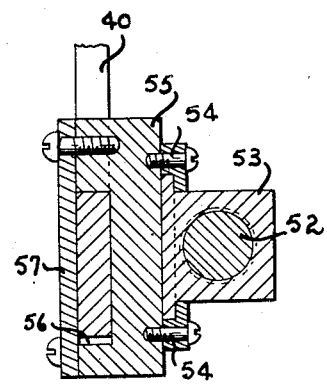
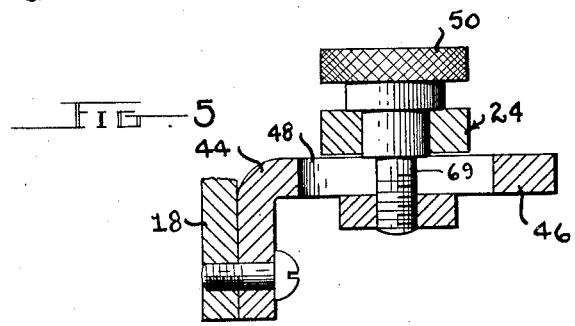
Inventors
DAVID E. BENCH
& MELVIN A. CROSBY
By Taulmin & Taulmin
Attorneys Dec. 19, 1944.  D. E. BENCH ET AL  2,365,329
DISPENSING PUMP COMPUTER
Filed May 16, 1940  3 Sheets-Sheet 3
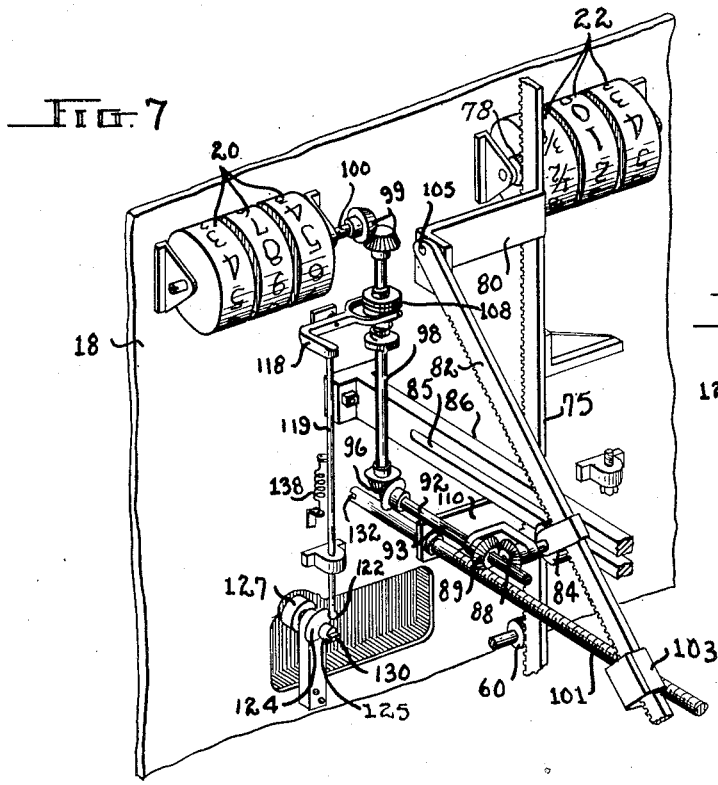
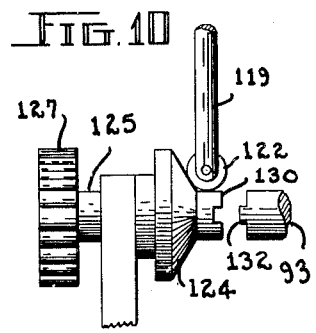
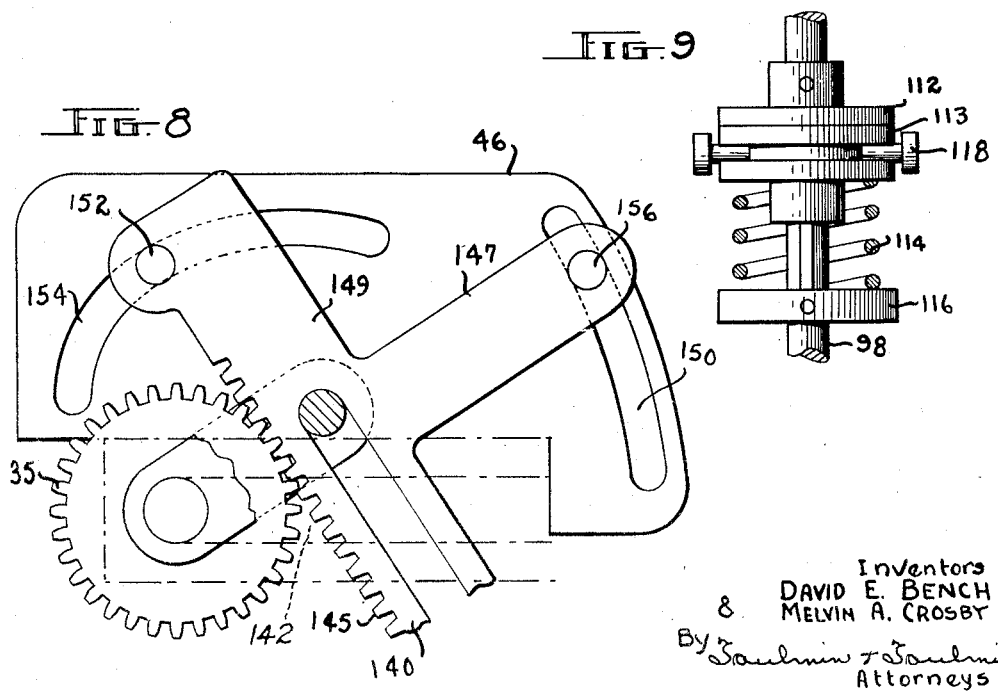
Inventors
DAVID E. BENCH
& MELVIN A. CROSBY
By Toulmin & Toulmin
Attorneys Patented Dec. 19, 1944

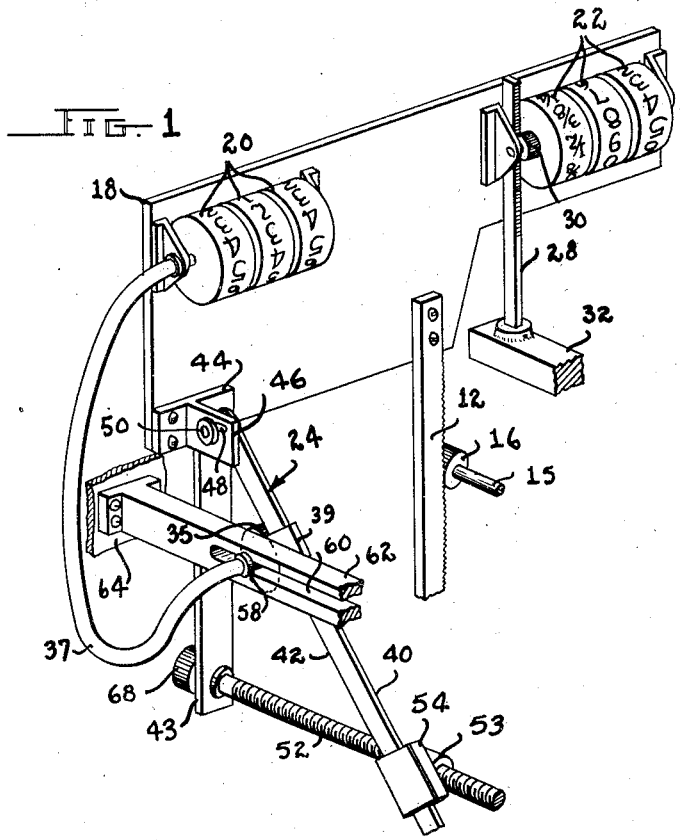

2,365,329

UNITED STATES PATENT OFFICE 2,365,329

DISPENSING PUMP COMPUTER

David E. Bench and Melvin A. Crosby, Dayton, Ohio, assignors to The Dayton Pump and Manufacturing Company, Dayton, Ohio, a corporation of Ohio Application May 16, 1940, Serial No. 335,592

5 Claims. (Cl. 235—61)

This invention relates broadly to mechanism for indicating the quantity and sale price of fluids dispensed. The invention is more particularly adapted for gasoline dispensing apparatus of the money value computing type, however, the mechanism is applicable to any fluid dispensing apparatus having means movable in proportion to the amount of fluid dispensed and is illustrated and described for convenience as applied to a gasoline dispensing pump which is used in dealing out gasolines and other fuels at motor vehicle service stations.

It is an object of this invention to provide an improved mechanism which can be connected to a fluid meter driven mechanism to accurately indicate the amount of liquid dispensed and to compute the sale price thereof.

Another object is to provide a mechanism for attachment to a fluid meter driven means so as to indicate on a visible dial the amount of fluid dispensed and the sale price of the same.

Another object is to devise an improved quantity and price computing mechanism for coacting with a meter driven member to indicate unit quantities of liquid dispensed together with the price of the total amount of liquid dispensed.

Another object resides in the provision of an improved mechanism for attachment to fluid dispensing pumps wherein an adjustable inclined plane and follower means are utilized for actuating a counter means to accurately compute and display the total cost or sale price of the fluid dispensed.

Another object is to devise an improved quantity and price computing mechanism for attachment to metering means on a fluid dispensing apparatus whereby actuation of the metering means is effected to accurately indicate the quantity and sale price of the fluid dispensed at any one time.

Another object is to provide price computing and gallonage indicating mechanism for attachment to fluid dispensing pumps which is readily adjustable to take care of variations in price per gallon of the liquid dispensed.

These and other objects will become apparent from the following description taken in connection with the accompanying drawings showing preferred embodiments of this invention, in which, Figure 1 is a diagrammatic perspective view of one embodiment of this invention, certain parts being broken away to show more distinctly the construction and operation of the different parts forming the quantity and price computing mechanism.

Figure 2 is a vertical sectional view taken through a liquid dispensing apparatus embodying the price computing mechanism of this invention, certain parts being broken away to more clearly illustrate the cooperation of the different parts of the device.

Figure 3 is a fragmentary elevational view taken at the front of the device showing the quantity and price computing counter means and associating parts.

Figure 4 is a detail view partly in section illustrating the method of adjustably fastening the inclined plane member at the top to a supporting bracket.

Figure 5 is a detail view of the adjusting screw means for holding the inclined plane to the bracket.

Figure 6 is a cross sectional view taken through the adjusting screw and inclined plane mechanism showing a method of attaching the follower to the price adjusting screw means.

Figure 7 is a diagrammatic perspective view of a modified construction wherein the quantity and price computing counter means are mounted in the face of the apparatus and are maintained fixed while being rotated by a rack and associated gearing mechanism.

Figure 8 is a detail view showing a modified construction for adjustably holding the top of the inclined plane member to the movable rack mechanism shown in Figure 7.

Figure 9 is a detail view of the clutch mechanism utilized for disengaging the price computing counter drive shaft.

Figure 10 is a detail view of the mechanism for adjusting the price computing means as required when the price per unit quantity of liquid dispensed changes.

In general, this invention provides a simplified improved mechanism for attachment to fluid dispensing devices having a pump and meter driven means whereby the quantity and money value or sale price of the fluid or liquid dispensed is indicated on a visible dial at opposite sides of the dispensing apparatus. The mechanism illustrated is provided with a variable inclined member and coacting follower which is actuated in response to the amount of fluid flowing through the meter means. The price computing means is changed to correspond to the price change in unit quantities of the fluid dispensed by merely changing the angular setting of the inclined plane so as to modify the travel of the follower. In this way, the device is made to accurately indicate the total price of the liquid dispensed in accordance with the setting of adjustable screw means connected to one end of the inclined plane at a unit or fractional unit price within the range in which the mechanism is operable. This is accomplished without requiring the exchanging of gears or other parts and substitution of new price charts with each change of price of the fluid dispensed.

Quantity and price computing mechanism

Referring to the drawings in detail, there is illustrated in Figures 1 to 6, one embodiment of this invention as applied to a liquid type dispensing apparatus. The device includes a pump, not shown, which is connected by suitable piping to a meter generally designated 10 so as to cause fluid to flow through the meter. The meter is arranged to drive the rack 12 through the beveled gearing 14, shaft 15 and pinion 16 as shown in Figures 1 and 2. The rack 12 is fastened at its upper end to the movable panel means 18 on which are mounted the price computing counter means 20, quantity indicating counter means 22 and adjustable inclined plane means generally designated 24. It will be understood that similar quantity and price computing indicating mechanism is provided on the opposite side of the dispensing device so that liquid can be dispensed from either side of the device and the indicator observed as is the customary practice at gasoline filling stations.

As illustrated in Figures 1, 2 and 3, the price computing and quantity indicating counters 20 and 22 respectively are mounted adjacent the window or opening 26 in the front panel 18 of the dispensing pump so that the indicia on the counters can be readily seen through the window. The price computing and quantity registering counter means may be mounted closely adjacent each other or spaced as illustrated in Figure 1. Rotation of the quantity indicating counter means 22 is provided for by the rack 28 and pinion 30. Rack 28 is fixed on the frame part 32 of the apparatus and the counter means 22 is rotated by movement of the pinion over rack 28 as the member 18 is raised or lowered through rotation of the pinion 16 over the rack 12. Movement of the member 18 is responsive in proportionate amount to the fluid flowing through the meter 10 which is drivingly connected thereto.

Rotation of the numeral wheels on the price computing counter 20 is effected during reciprocation of the member 18 through rotation of the pinion gear 35 and flexible interconnecting shaft 37, as shown in Figure 1. The pinion 35 is mounted on follower 38 which is adapted to slide lengthwise along the inclined plane member 40 and to engage with the teeth or rack portion 42 of the underside of the member 40. The inclined member 40 is adjustably supported by the frame means 43 and bracket 44 attached to the member 18. Bracket member 44 comprises a T-shaped member having an extending portion 46 to which is adjustably secured in slot 48 the upper end of the inclined plane member 40. A knurled fastening bolt 50 is utilized for releasably retaining the upper end of member 40 in the slot 48.

At the lower end of the member 43 is mounted an adjusting screw 52 which is threaded throughout its length and engages a nut 53. Suitably fastened to the nut 53, as by means of screws 54, is a guide member 55 having a slot 56 along which the inclined plane member 40 is adapted to slide. The member 40 is retained in slot 56 by means of the attached plate member 57 at the end. The gear 35 is supported at its hub portion 58 in the slot 60 of the member 62 which is fixed to the frame portion 64 of the apparatus. During operation, reciprocation of the member 18 carrying the inclined plane member 40, it will be observed, brings about rotation of the gear 35 along the rack portion 42 of the inclined plane member 40 while the same is moved horizontally in the slot 60, the amount of rotation of the gear 35 being controlled by the angle at which the member 40 is set to make with the member 43.

Means for changing the computing device in accordance with the price change

As the current price of the liquid dispensed changes, it is necessary to reset the computing device so that it will accurately compute and indicate the total price of fluid delivered at the new price. In order to do this, it is only necessary to loosen the bolt 50 as by grasping the knurled head portion, adjust the screw 52 by turning the knob 68, and then adjust the inclined plane member 40 so as to change it to a different angle with the vertical member 42. Preferably, the device is arranged so that this adjustment can only be made after the indicating mechanism has been returned to zero. Rotation of the gear 35 is prevented during adjustment of the inclined plane 40 by permitting movement of the upper end of the member 40 attached to the bolt portion 69 of the member 50 in the curved slot 48 formed in the bracket portion 46. The longitudinal axis of the slot 48 forms an involute curve and thus permits movement of the plane member 40 over the teeth surface of the gear 35 without rotating the gear 35, as disclosed in Figure 4. The knurled screw head member 68 is arranged to be operated by a gear means 70 rotated by a suitable crank means 72, as illustrated in Figure 2. Adjustment of the screw 52 may be effected only when the inclined plane mechanism 24 is at its initial or zero reading position. It will be understood that suitable counterbalancing weight means may be employed for effecting a smooth operation of the indicator mechanism.

Modified indicator construction

As shown in Figures 7, 8 and 9, there is illustrated a modification of the indicator mechanism shown in Figures 1 to 6 wherein the price computing counter means 20 and quantity indicating counter means 22 are maintained stationary relative to the panel 18 and rotated by suitable rack and pinion mechanism. In this modification, a meter driven pinion 60 moves the rack 75 over pinion 78 of the quantity counter means 22 so as to register the amount of liquid dispensed. Suitably attached to the rack 75 by means of the member 80 is adjustable inclined plane rack member 82 which carries a follower gear member 84 similarly as gear 35 of the construction shown in Figures 1 and 2. In this instance, the gear 84 is arranged to reciprocate horizontally in the slot 85 of the fixed member 86 and the opposite end of the pinion shaft is provided with beveled gear members 88 and 89 as shown in Figure 7. The beveled gear 89 is arranged to slide axially over the shaft 92 in the keyway 93 so as to provide for axial movement as well as rotary movement. Rotation of the gear 84 during raising or lowering of the rack 75 is directly transferred through the beveled gears 96 on shafts 92 and 98 to the price computing counter 20. Suitable beveled gears 99 are arranged to drive the shaft 100 of the counter upon rotation of the shaft 98.

Similar adjusting screw means 101 is provided for moving the inclined plane rack 82 into a different postion by threading inward or outward of the inclined plane guide means 103. In this construction, the upper end of the inclined rack 82 is merely pivotally attached as at 105 to the end of the member 80. In order to permit the return of the price indicating counter means to zero, clutch 108 is mounted on shaft 98 in order to disconnect the shaft while resetting the inclined plane so as to make the device compute at a different price or unit quantity of liquid dispensed. The adjusting screw means 101 is arranged to be carried upward with the rack 75 and 82 by means of the attaching member 110. The clutch mechanism as shown in Figure 9 is of the usual construction and comprises the separable disks 112 and 113 which are normally maintained pressed together by the spring 114 compressed between the stop means 116 and the disk 113, which is slidable on the shaft 98. Suitable fork means 118 is provided for disengaging the clutch as shown in Figure 7.

Preferably, means is provided for simultaneously declutching the drive shaft 98 from the counter mechanism 20 when it is desired to change the price at which the liquid dispensed is computed. Such a mechanism is shown in Figure 7 wherein the rod 119 is attached to the clutch operating fork lever 118 and the lower end of the rod 119 is provided with a roller member 122 which is adapted to engage the beveled surface 124 on the crank shaft 125 of the resetting member 127 when it is pushed inward so as to engage the tool end portion 130 with the end of the adjusting screw 93 as at 132. It will be noted that upon returning the mechanism to zero, the adjusting screw 93 will have its head portion 132 adjacent the connecting crank end portion 130 so that upon pushing inward on the knob 127, the inclined surface 124 engages the roller 122 of the member 119, forcing it upward to open the clutch 108. This permits adjustment of the screw 93 and inclined plane 82 without interfering with the zero reading of the counter 20.

After the inclined plane 82 has been set to the desired position, member 127 is released and the tool end 130 is automatically shifted out of engagement with the adjusting screw end portion 132. This is brought about by the action of spring 138 which, upon retraction of the member 127, shifts the rod 119 so as to re-engage the clutch 108 and place the mechanism in condition for operation at the new price per unit quantity of liquid dispensed.

In Figure 8, there is shown a modified construction of the method of adjustably attaching the inclined plane to the bracket 46 so as to provide for movement of the inclined plane 140 into a different position without rotating the gear 35. In the construction shown, the pinion 35 is retained in a horizontal slot 142 in the inclined plane member 140 and is adapted to travel up and down along the rack portion 145 during operation of the device.

In order to eliminate the necessity of providing a fastening means at the upper end of the inclined plane member 140, as shown at 50 in Figure 1, the member 140 comprises an arm member 147 which extends at right angles to the portion 149. Fixed to the uppermost part of the portion 149 is a pin means 152 which is slidable in the curved slot 154. The longitudinal axis of this slot is in the form of an involute similar to slot 49 of the mechanism illustrated in Figure 4. Similarly the arm 147 comprises a pin 156 fixed on the outer end of the arm which is adapted to reciprocate in curved slot 158.

It will be noted that by this arrangement the inclined plane 140 is prevented from rotating the gear 35 which is directly connected to the counter means 20 during adjustment of the plane since the pins 152 and 156 working in the slots 154 and 158, respectively, restrain the inclined plane 140 against movement longitudinally while it is being adjusted as by turning the adjusting screw 52, shown in Figure 2.

The operation of the device will be readily understood from the above description and it is not considered necessary to describe this in further detail. Preferably the adjustable inclined plane mechanism will be calibrated and operatively connected to a graduated scale or other suitable indicating means, whereby the price per unit quantity of liquid at which the quantity of liquid dispensed is being computed is displayed to the operator and customer.

Further, it will be understood that this invention is not limited to the particular embodiments illustrated in the drawings and described, but is broadly applicable to various types of quantity dispensing devices and that such modifications as will occur to persons skilled in the art are intended to be included within the scope of this invention as defined by the appended claims.

Having thus fully described our invention, what we claim as new and desire to secure by Letters Patent is:

1. In a liquid dispensing apparatus of the money value and quantity indicating type, a price computing mechanism including an indicator, a vertically movable support for said indicator, an inclined rack, a pinion follower member rotated by said inclined rack, a flexible driving connection between said member and the price computing indicator, a bracket on said support, pivotal means for connecting said inclined rack to said bracket, a pin carried near the extremity of said rack, and an involute curved slot in said bracket which receives said pin, said slot being struck from a center which permits angular adjustment of said rack about said pinion, said rack being guided by said slot so as to rotate about the periphery of said pinion during its angular adjustment without rotating said pinion.

2. In a price computing and indicating mechanism comprising a vertically movable panel, means for reciprocating said panel, supporting means on said panel for carrying said price indicator and means for transmitting the reciprocations of said panel to and transforming them into rotations of said price indicator; said reciprocations transferring means comprising an inclined rack with means for connecting said inclined rack to said panel, a drive transmitting pinion member, means stationary with respect to said panel for displaceably supporting said pinion member, means for retaining said pinion member in continuous engagement with said rack, and a flexible driving connection between said pinion member and said price indicator.

3. In a liquid dispensing apparatus of the money value and quantity indicating type, a price computing mechanism including a rotary indicator, a vertically movable support for said indicator, an inclined rack, a pinion follower member rotated by said inclined rack, a flexible driving connection between said member and the price computing indicator, a bracket on said support, pivotal means for connecting said inclined rack to said bracket, a pin carried near the extremity of said rack, and an involute curved slot in said bracket which receives said pin, said slot being struck from a center which permits angular adjustment of said rack about said pinion, said rack being guided by said slot so as to rotate about the periphery of said pinion during its angular adjustment without rotating said pinion, and means for adjusting the angle of said rack whereby to regulate the speed of the rotation of said indicator and with it the price indicated.

4. In a price computing and indicating mechanism comprising a vertically movable panel, means for reciprocating said panel, supporting means on said panel for carrying said price indicator and means for transmitting the reciprocations of said panel to and transforming them into rotations of said price indicator; said reciprocations transferring means comprising an inclined rack with means for connecting said inclined rack to said panel, a drive transmitting pinion member, means stationary with respect to said panel for displaceably supporting said pinion member, means for retaining said pinion member in continuous engagement with said rack and flexible driving connection between said pinion member and said price indicator, and means for adjusting the angle of said rack whereby to regulate the speed of the rotation and with it the price indicated.

5. In a price computing and indicating mechanism comprising a vertically movable support for said price indicator, an inclined rack, means for connecting said rack to said support so that it is movable therewith, a stationary support, a drive transmitting pinion, means for displaceably mounting said pinion on said stationary support, and means for maintaining said pinion in continuous engagement with said rack as it is displaced with said movable support.

DAVID E. BENCH.
MELVIN A. CROSBY.